Aug. 30, 1960 G. C. TERRY 2,950,712
CHARCOAL GRILL WITH REMOVABLE FIRE BOX
Filed Oct. 15, 1957 3 Sheets-Sheet 1
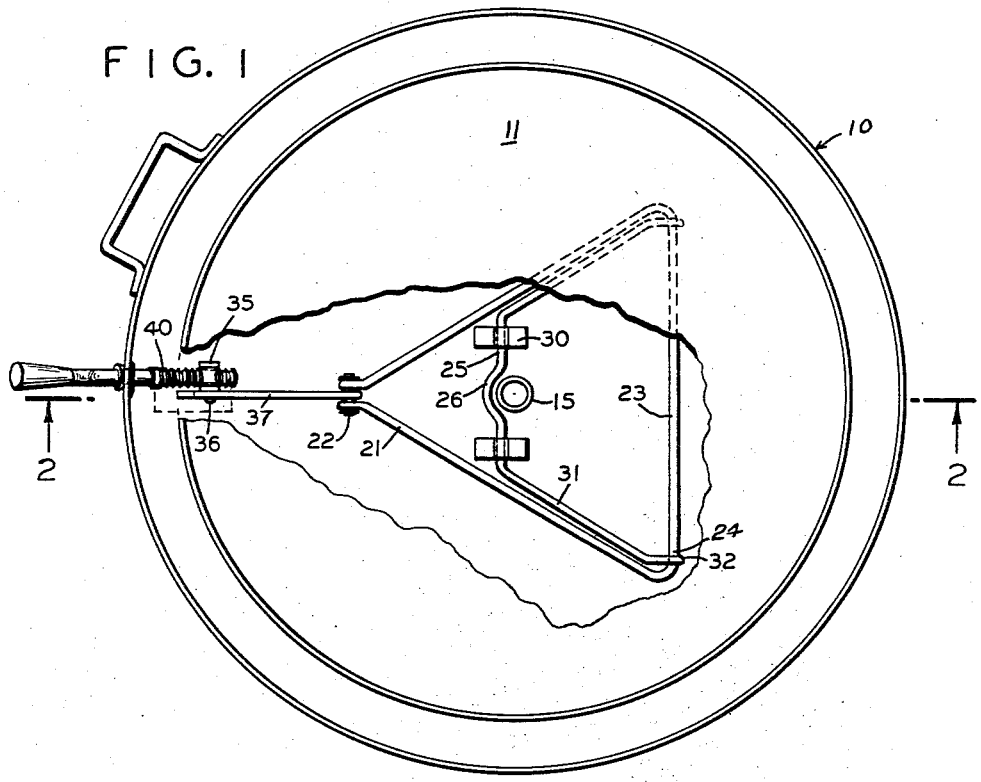
FIG. 1
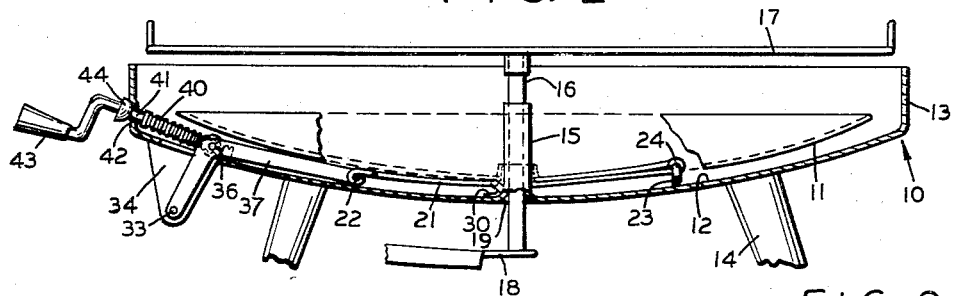
FIG. 2
FIG. 10
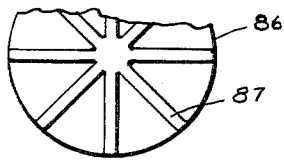
FIG. 8
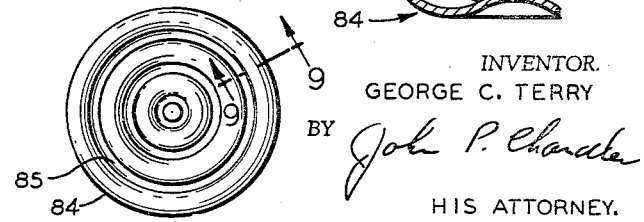
FIG. 9
INVENTOR.
GEORGE C. TERRY
BY John P. Chandler
HIS ATTORNEY.

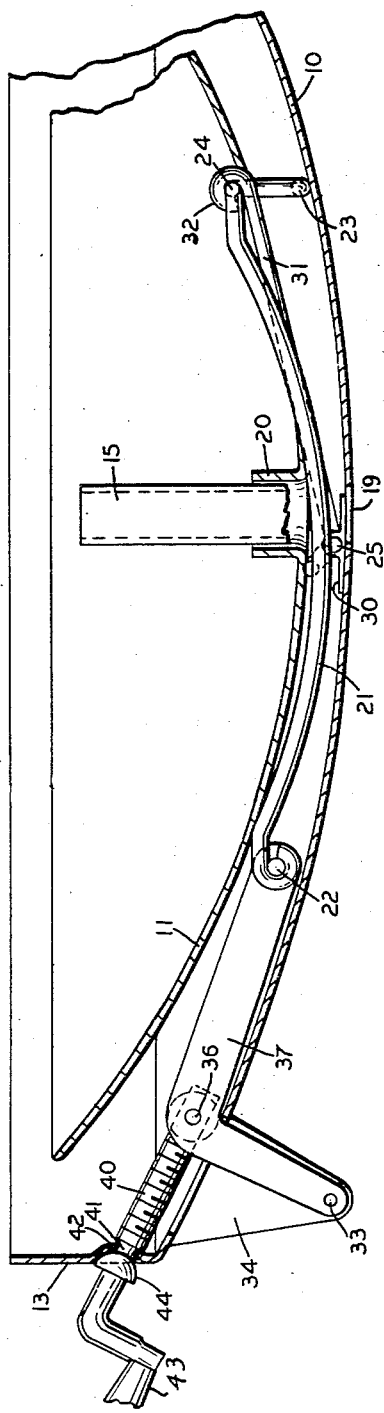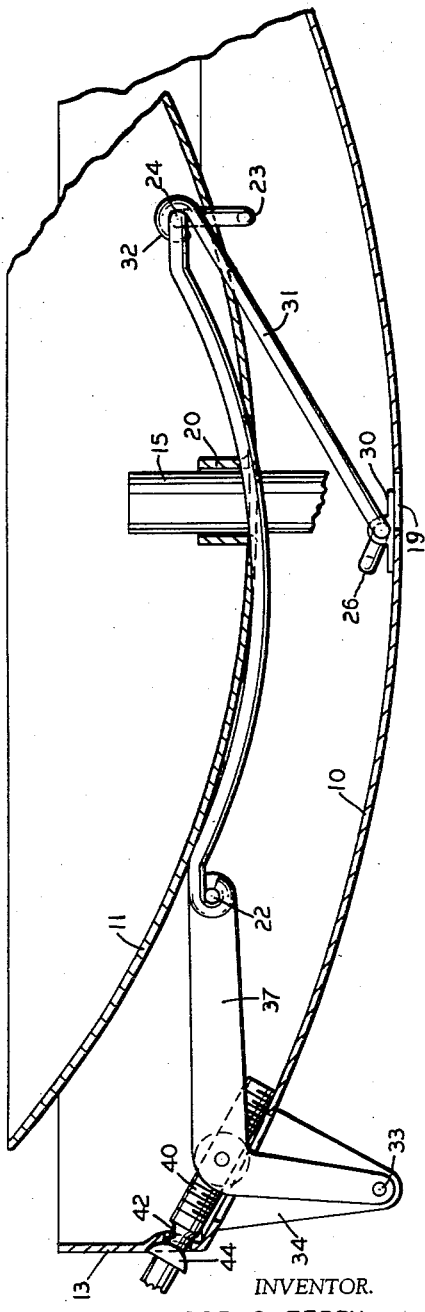

Aug. 30, 1960 G. C. TERRY 2,950,712
CHARCOAL GRILL WITH REMOVABLE FIRE BOX
Filed Oct. 15, 1957 3 Sheets-Sheet 3

INVENTOR.
GEORGE C. TERRY
BY John P. Chandler
HIS ATTORNEY.

United States Patent Office 2,950,712
Patented Aug. 30, 1960

2,950,712

CHARCOAL GRILL WITH REMOVABLE FIRE BOX

George C. Terry, Garden City, N.Y., assignor to Kamkap, Inc., New York, N.Y., a corporation of New York Filed Oct. 15, 1957, Ser. No. 690,375

1 Claim. (Cl. 126—25)

This invention relates to charcoal grills and relates more particularly to a novel outdoor or indoor grill wherein the fire box is an element separate from the outer housing or bowl and the fire box is adjustable as to height in order to vary the distance of the meat or other food being cooked from the grid upon which the meat is supported.

Many charcoal broilers provide means for raising and lowering the grid in order that the article to be broiled may be moved closer to the heat as the fire diminishes. An important object of the present invention is to provide a novel grill having a fixed or adjustable grid and a separate fire box is disposed wholly within the confines of a bowl structure which in most instances has in the past served as the fire box.

The present invention is most suitable for a charcoal broiler of the brazier type. The bowl of the brazier is supported on legs and during the cooking operation the bowl in the conventional grill necessarily becomes quite hot so that if one should inadvertently move the body into contact with the bowl a severe burn might occur.

In accordance with the present invention the outer housing or bowl is always relatively cool and the fire box, which is of generally watch glass shape, is supported on its lower convex surface at a plurality of spaced points, the supporting elements being conjointly movable up and down by a single actuating means. Since the fire box simply lays on the supporting elements it may be readily removed after the cooking operation for the purpose of emptying the ashes.

Another object of the invention is to provide a novel adjustable fire box for a charcoal broiler wherein the means for raising and lowering the fire box is confined wholly within the bowl except, of course, for the manually movable lever or screw which extends from the bowl to a convenient point.

Yet another object of the invention is to provide in a charcoal broiler a fire box of improved contour which allows it to warp locally as a result of the heat without distorting the entire structure. A brazier bowl has a lower spherical surface with a straight vertical annular flange 2 to 4 inches in height. During the normal burning operation the area, large or small, of the lower spherical surface which supports the charcoal tends to expand and this warps and disfigures the entire bowl, whereas in the fire box of the present invention any warpage is readily distributed throughout the box without causing undue distortion. In other words, the entire contour of the fire box consists of one or a plurality of surfaces and the fire box can either be of watch glass shape comprising a continuous spherical surface or it can have a plurality of annular or radial corrugations which are curved in cross section. This permits the fire box, for the first time, to have a coating of vitreous enamel on one or both faces without causing the enamel to peel or crack.

A still further object of the invention is to provide a structurally and functionally improved charcoal grill which has increased efficiency while allowing for a distinct saving in fuel. The normal flow of air under a conventional brazier causes a cooling of the fire box and a loss of heat. This is eliminated by the presence of the bowl under the fire box in spaced relation thereto since the air space is warmed by direct conduction and this dead air space is a good insulator. Although the bowl is heated to some extent the heat is not intense so that the outer surface of the bowl can be painted or otherwise decorated without the possibility of the heat destroying the paint or other ornamentation.

In the drawings:

Fig. 1 is a plan view of a charcoal grill embodying the present invention, a portion of the fire box being broken away to show its supporting structure.

Fig. 2 is a section taken on line 2—2 of Fig. 1.

Fig. 3 is an enlarged broken section showing the position of the parts when the firebox is in its lowermost position.

Fig. 4 is a similar view showing the fire box in elevated position.

Fig. 8 is a plan view of a modified fire box.

Fig. 9 is a broken section taken on line 9—9 of Fig. 8.

Fig. 10 is a broken plan view showing a further modification in the construction of the fire box.

Figure 5:
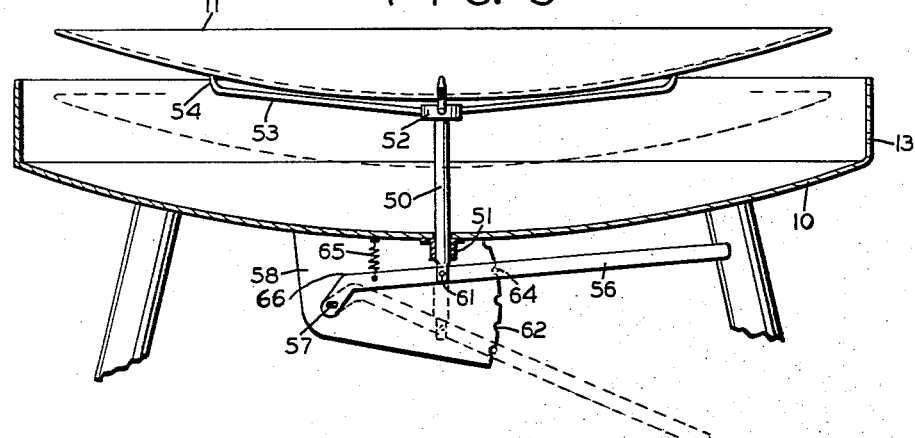
Fig. 5 shows a modified fire box supporting arrangement.

Referring now more particularly to Figs. 1 to 4 of the drawings, the grill comprises an outer housing or bowl 10 and an inner member or fire box 11 which is of generally watch-glass shape, concave on its upper surface, and which is vertically movable to an adjusted, fixed position.

The bowl has a concave lower surface 12 and an upstanding vertical flange 13 around its periphery. Legs 14 support the bowl and at its center there is an opening 19 and a vertical sleeve 15 extending upwardly therefrom which receives a post 16 supporting a grid 17 at its upper end. The post, which has been omitted from Figs. 3 and 4, is removable from the socket when the fire box is to be filled with charcoal or other fuel. In Fig. 2 the post is shown as extending down through the sleeve and may be supported by a lever shown fragmentarily at 18 which raises or lowers the grid to an adjusted fixed position. The fire box has a diameter of several inches less than flange 13. It will be noted that the fire box has substantially the same curvature as the concave lower surface of the bowl. The fire box is further provided with a central opening and an annular flange 20 which catches accumulated grease and prevents it from dripping onto the floor or terrace supporting the grill.

The structure providing a three-point support for the fire box and also raising and lowering the same comprises an elevator hoop of generally triangular shape including side sections 21 which receive a pivot pin 22 and a connecting section 23 which is downwardly offset from its terminals 24. In side elevation the side sections are downwardly curved as shown in Fig. 3. A generally U shaped frame 25 having a central offset portion 26 to clear sleeve 15 is pivoted on the upper face of the bowl by means of brackets 30. The opposed side sections 31 of the frame have rings 32 at their outer ends which receive the terminals 24 of connecting section 23 of the hoop.

A generally L shaped tie rod 37 receives pivot pin 22 at one end and is itself pivoted at 33 on a fixed tie rod bracket 34. The central section of the tie rod pivotally supports a nut-like element 35 at 36. This element receives a lead screw 40 whose unthreaded section 41 is journalled in a side wall opening 42 in flange 13. A crank 43 is fixed at the outer end of the screw. A ball shaped stop 44 limits inward travel of the screw. The wall adjacent opening 42 is struck inwardly to accommodate the ball shaped stop 44.

Fig. 3 shows the supporting and elevating structure for fire box 11 in its lowermost position. As screw 40 is rotated the tie rod moves the loop to the left (Fig. 4) and elevates the fire box. In view of the fact that the fire box is adjustable as to height it is not entirely necessary that the grid be adjustable also but this is sometimes preferred.

Fig. 5 shows an alternative adjustable support for fire box 11 which view omits the grid. A supporting post 50 is journalled for sliding movement in a bearing 51 aligned with a center opening in the outer bowl 10. A hub 52 fixed at the upper end of post 50 supports a plurality of radial arms 53 on whose upturned outer terminals 54 the fire box sits. A lever 56 pivoted at 57 on a bracket 58 is connected at 61 to the lower end of post 50. The outer curved edge of the bracket has a plurality of notches 62 which receive a pin 64 carried by lever 56. The effective length of the lever between pin 64 and the pivot is such as to cause the pin to reside in one of the notches 62. The lever is offset at 66 to give it a bending section when the lever is moved, thus allowing the pin to travel over the curved edge of the bracket to the next notch. A spring 65 urges the fire box supporting structure upwardly.

Figure 6:
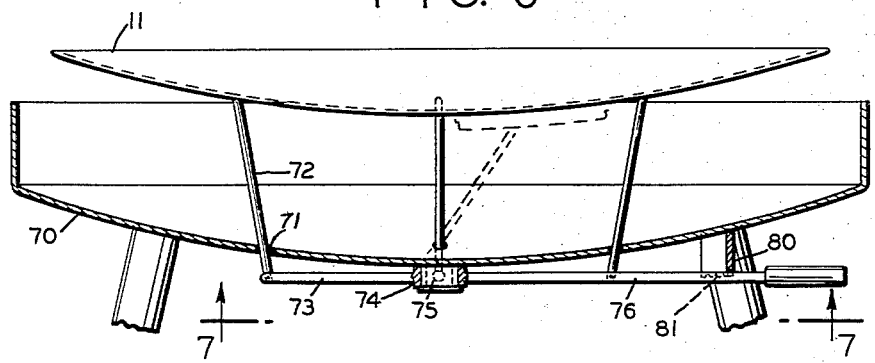
Fig. 6 shows another modified form.
Figure 7:
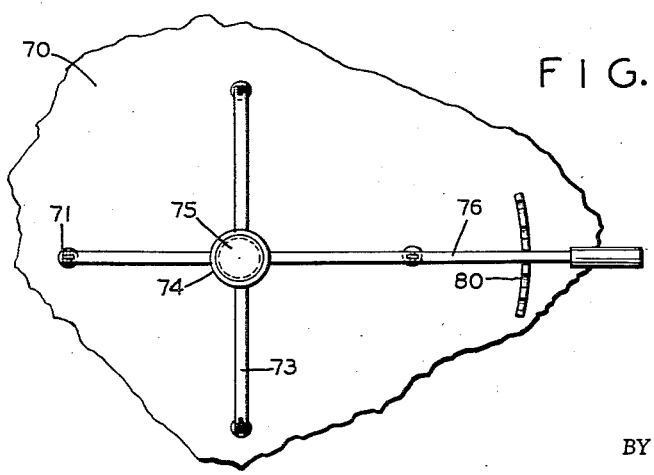
Fig. 7 is a broken section taken on line 7—7 of Fig. 6.

A further modified arrangement is shown in Figs. 6 and 7 wherein outer bowl 70 has a plurality of spaced openings 71 to receive arms 72 loosely pivoted on radial arms 73 secured to a hub 74 pivoted on a bushing 75. One of radial arms 76 is longer than the others and forms a handle for rotating the hub. A bracket 80 has notches for receiving the arm in an adjusted position. Rotation of the arms 73—76 produces a compound motion in vertical arms 72 causing them to move diagonally, thus lowering the fire box.

Two modifications in the construction of the fire box are shown in Figs. 8, 9 and 10. Figs. 8 and 9 show a fire box 84 whose surface comprises a plurality of generally concentric annular corrugations 85 so that the entire structure consists of curved lines and has an absence of straight lines. In Fig. 10 the fire box 86 has a plurality of radial corrugations 87 consisting of channels or ridges and although the bottom of the channels or the tops of the ridges may be substantially straight the cross-sectional contours thereof are curved and this permits localized heating to occur without producing warpage of the general contour of the fire box.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What I claim is:

A charcoal grill comprising an outer bowl provided with supporting means and having a concave upper surface and an upstanding annular rim around its edge, a sleeve extending upwardly from the bowl, a post extending through the sleeve, a lever engaged by the lower end of the post to adjust the height thereof, and a grid secured at the upper end of the post, a fire box of generally watch glass shape positioned within the bowl and having a substantially imperforate wall with substantially the same curvature as the bowl, said fire box being of lesser diameter than the annular rim and having a central opening to receive the sleeve, an annular flange extending upwardly from said opening, and operating means between the bowl and the fire box for supporting the fire box in spaced relation to the bowl and for raising and lowering the same to an adjusted, fixed position.

References Cited in the file of this patent

UNITED STATES PATENTS

| | | |
|---|---|---|
| 45,256 | Markham | Nov. 29, 1864 |
| 177,027 | Stansbury | May 2, 1876 |
| 271,214 | Brower | Jan. 30, 1883 |
| 667,014 | Hull | Jan. 29, 1901 |
| 1,069,802 | Mokry | Aug. 12, 1913 |
| 1,986,035 | Wells | Jan. 1, 1935 |
| 2,114,698 | Babin | Apr. 19, 1938 |
| 2,221,098 | Langsam | Nov. 12, 1940 |
| 2,403,134 | Stephenson | July 2, 1946 |
| 2,487,605 | Smith | Nov. 8, 1949 |
| 2,507,243 | Boyd et al. | May 9, 1950 |
| 2,531,684 | Jackson | Nov. 28, 1950 |
| 2,541,528 | McAvoy | Feb. 13, 1951 |
| 2,624,329 | Ernst | Jan. 6, 1953 |
| 2,681,404 | Hofer | June 15, 1954 |
| 2,747,567 | Goodwin | May 29, 1956 |
| 2,797,633 | Goodwin | July 2, 1957 |
| 2,797,681 | Crosley et al. | July 2, 1957 |

FOREIGN PATENTS

| | | |
|---|---|---|
| 72,379 | Austria | Sept. 11, 1916 |
| 323,255 | France | Nov. 5, 1902 |